(12) United States Patent
Mohammad et al.

(10) Patent No.: US 11,453,951 B1
(45) Date of Patent: Sep. 27, 2022

(54) METHOD FOR AMMONIA RECOVERY FROM CONTAMINATED WATER INCLUDING SOLVAY EFFLUENT AND AQUEOUS SOLUTIONS

(71) Applicant: United Arab Emirates University, Al Ain (AE)

(72) Inventors: Ameera Mohammad, Al Ain (AE); Ali Al Marzouqi, Al Ain (AE); Muftah El Naas, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 17/340,694

(22) Filed: Jun. 7, 2021

(51) Int. Cl.
| | |
|---|---|
| C25B 15/08 | (2006.01) |
| C25B 1/27 | (2021.01) |
| C01C 1/10 | (2006.01) |
| C01C 1/02 | (2006.01) |
| C02F 9/00 | (2006.01) |
| C25B 1/50 | (2021.01) |
| C02F 1/463 | (2006.01) |
| C02F 103/34 | (2006.01) |
| C02F 1/00 | (2006.01) |
| C02F 101/16 | (2006.01) |
| C02F 1/20 | (2006.01) |
| C02F 1/461 | (2006.01) |
| C02F 1/66 | (2006.01) |

(52) U.S. Cl.
CPC .............. *C25B 1/27* (2021.01); *C01C 1/026* (2013.01); *C01C 1/10* (2013.01); *C02F 9/00* (2013.01); *C25B 1/50* (2021.01); *C02F 1/001* (2013.01); *C02F 1/20* (2013.01); *C02F 1/463* (2013.01); *C02F 1/46109* (2013.01); *C02F 1/66* (2013.01); *C02F 2001/46133* (2013.01); *C02F 2101/16* (2013.01); *C02F 2103/34* (2013.01)

(58) Field of Classification Search
CPC ........... C25B 15/08; C25B 9/19; C25B 15/00; C25B 1/00; C25B 3/25; C25B 1/04; C25B 9/40; C25B 9/70; C02F 2209/06; C02F 2201/4618; C02F 1/461; C02F 1/463; C02F 1/46109; C02F 2201/46135; C02F 2201/4614
See application file for complete search history.

(56) References Cited

U.S. PATENT DOCUMENTS

2014/0069821 A1* 3/2014 Marcin ..................... C25B 1/26 205/498
2019/0077673 A1* 3/2019 Yazdanbod ............... C25B 9/23

* cited by examiner

*Primary Examiner* — Zulmariam Mendez
(74) *Attorney, Agent, or Firm* — Hayes Soloway P.C.

(57) ABSTRACT

This invention describes a novel recovery method of ammonia through the electrocoagulation process, which may be applied in the industrial as well as the environmental sectors. The present invention has a significant impact not only on recovering the ammonia content from the Solvay effluent, but also for recovering the ammonia from landfill leachate and different sources of wastewater where high concentrations of ammonia can be found. This invention has economic benefits in recovering ammonia and reducing the required energy in such processes. Another impact is the environmental one, where ammonia can cause problems such as toxicity to the organisms living in the soil or water bodies, and could also decrease the concentration of the dissolved oxygen.

18 Claims, 8 Drawing Sheets

FIGURES

|  | Maximum ammonium chloride removal (%) | Ammonia recovery (%) | Energy consumption | Time needed for 95% ammonium chloride removal |
|---|---|---|---|---|
| EC | 99.99 | 77.14 | 2.301 kWh/kg $NH_3$ | 6 hr |
| Heating up to 160 °C | 99.99 | 98.06 | 7.77 kWh/kg $NH_3$ | 3 hr |

FIG. 6

METHOD FOR AMMONIA RECOVERY FROM CONTAMINATED WATER INCLUDING SOLVAY EFFLUENT AND AQUEOUS SOLUTIONS

FIELD OF THE INVENTION

The present invention relates to a new process for ammonia recovery from contaminated water including Solvay™ effluent and aqueous solutions.

BACKGROUND

Recovering ammonia from different water sources by conventional treatment techniques needs extensive energy, only to release it back to the gaseous phase. Energy consumption of any method to recover ammonia is analytically very important to estimate whether the process will be energy efficient and hence cost-effective. Any efficient recovery system will advantage our environment with pollutant removal, decreased carbon footprint, and reduced raw materials or energy input. The development of an inexpensive and sustainable method for recovery of the nitrogen content from high salinity brine before and after the Solvay™ process is highly valuable in the brine desalination and valorization sector. Using the Solvay™ process requires excessive amounts of ammonium hydroxide to produce sodium bicarbonate or carbonate, and to recover the magnesium hydroxide content from brine [1].

Many methods have been presented to remove ammonia at different concentrations from different types of water (wastewater, groundwater, municipal and industrial water, etc.). Less attention has been put for finding more efficient and cost effective methods for ammonia recovery. Conventional ammonium removal and ammonia recovery processes are the ammonia distillation, stripping, biological denitrification, ion exchange, chemical precipitation, and breakpoint chlorination. There are also hybrid methods, such as photocatalytic, electrochemical oxidation and Osmotic membrane bioreactor [2].

Ammonia recovery from different approaches was found to reach about 53% N recovery using crystallization at pH level of 8.92 [3], 77% N recovery using an anaerobic treatment at pH level of 9.2 [4], 75% N recovery using air stripping and absorption at $H_2SO_4$ concentration of 0.4 mol/L [5], 79% N recovery using electrochemical cell extraction at feed rate of 6 L/h [6], about 50% N recovery using chemical precipitation at airflow rate of 4-8 L/min [7], 55-81% N recovery using gas permeable tubing at pH level of 8.6 [8], 48% N recovery using ion exchange process at flow rate of 5.6 ml/min [9] and around 45% N recovery using capacitive membrane stripping at current density of 17.2 $A/m^2$ [10].

Each of the mentioned methods has some limitations, such as bacteria sensitivity for temperature and pH in the biological denitrification process. Additionally, the biological method is not responding very well to high concentrations of ammonium ions. [11]. The air-stripping method is considered to be a slow process and applicable only for high ammonia concentration; even more, an air pollution hazard is expected. The economic efficiency of the membrane contactors appears to be problematic because they require high maintenance costs [12]. Ion exchange approach may face the resin fouling in some cases but in general, more advantages of the process is recorded and outweigh the resin fouling [13].

The invention of the present disclosure proposes an alternative recovery method of ammonia from landfill leachate and different sources of wastewater, having economic benefits in recovering ammonia, reducing the environmental impact, reducing the required energy in such processes, and being highly efficient.

SUMMARY

In representative embodiments, the invention is directed at a novel method for ammonia recovery from Solvay™ effluent in the form of ammonium hydroxide.

The present invention has a significant impact not only on recovering the ammonia content from the Solvay™ effluent, but also for recovering the ammonia from landfill leachate and different sources of wastewater where high concentrations of ammonia can be found. This invention has economic benefits in recovering ammonia and reducing the required energy in such processes. Another impact is the environmental one, where ammonia can cause problems such as toxicity to the organisms living in the soil or water bodies, and could also decrease the concentration of the dissolved oxygen.

This invention describes a novel recovery method of ammonia through the electrocoagulation process, which may be applied in the industrial as well as the environmental sectors. No Disadvantages or limitations have been found for this invention.

In certain embodiments, disclosed herein is a method for ammonia recovery in the form of a solution of ammonium hydroxide that comprises two processes.

In further embodiments, the first process comprises the steps of adding calcium oxide to the Solvay™ effluent solution, applying an electrocoagulation process to the solution with aluminum electrodes and a current density, and applying air bubbling through the solution in a treating cell with an air inlet and an ammonia gas outlet stripping from the solution.

In further embodiments, the first process is followed by reacting the solution with carbon dioxide, filtrating the solution to recover solid precipitates, adding Ca(OH)2 to the filtrate solution to increase the pH to above 11, and introducing the solution in the electrocoagulation cell.

BRIEF DESCRIPTION OF THE DRAWINGS

The invention can be better understood with reference to the following figures and description.

FIG. 6 illustrates the comparison between the traditional method of recovery from ammonium chloride and the proposed electrocoagulation process.

DETAILED DESCRIPTION

Figure 1:
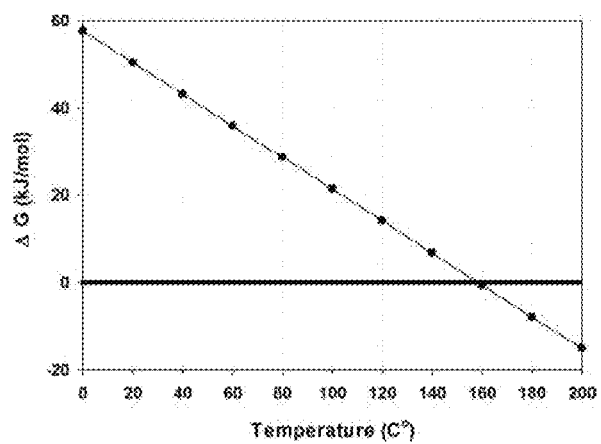
FIG. 1 illustrates calculated Gibbs free energy ($\Delta G$) versus temperature for reaction (1) using HSC software at atmospheric pressure and stoichiometric ratio.

In a first embodiment of the present disclosure, a method is disclosed for ammonia recovery at different concentrations from Solvay™ effluent in the form of ammonia solution (ammonium hydroxide) to be concentrated and used for other applications including a first process that comprises the steps of adding calcium oxide (CaO) to the Solvay™ effluent solution at around 1 to 10 wt. % to raise the PH and enhance ammonia dissociation from the treated brine; applying the solution to an electrocoagulation cell with aluminum electrodes and current density of 5 to 15 mA/cm$^2$ over a time range of 4 to 9 hours, and; bubbling air through the mixture resulting from the treated solution at low gas flow rate of 100-300 ml/min in a treating cell with one air inlet and one ammonia gas outlet to enhance ammonia stripping from the mixture.

In one embodiment of the present invention, calcium oxide (CaO) is added to the Solvay™ effluent solution at around 6 to 10 wt. %.

In a preferred embodiment of the present invention, calcium oxide (CaO) is added to the Solvay™ effluent solution at around 7.5 wt. %.

In one embodiment of the present invention, the current density range is 1 to 50 mA/cm$^2$ over a time range of 3 to 24 hours.

In another embodiment of the present invention, a current density range is 1 to 25 mA/cm$^2$ over a time range of 4 to 10 hours.

In a most preferred embodiment of the present invention, calcium oxide (CaO) is added to the Solvay™ effluent solution at around 7.5 wt. % and a current density range is 5 to 15 mA/cm$^2$ over a time range of 4 to 9 hours.

In one embodiment of the present invention, bubbling air through the mixture resulting from the treated solution at low gas flow rate of 50 to 500 ml/min in a treating cell with one air inlet and one ammonia gas outlet to enhance ammonia stripping from the mixture.

In one embodiment of the present invention, bubbling air through the mixture resulting from the treated solution at low gas flow rate of 75 to 400 ml/min in a treating cell with one air inlet and one ammonia gas outlet to enhance ammonia stripping from the mixture.

In a preferred embodiment of the present invention, bubbling air through the mixture resulting from the treated solution at low gas flow rate of 100 to 300 ml/min in a treating cell with one air inlet and one ammonia gas outlet to enhance ammonia stripping from the mixture.

In a second embodiment of the present invention, disclosed is a method wherein the second process that comprises reacting the mixture from the first process with carbon dioxide; filtrating the the solution to recover solid precipitates; adding calcium hydroxide to the Solvay™ filtrate solution to obtain a pH above 11; introducing the solution in an electrocoagulation cell.

In one embodiment of the present invention, carbon dioxide is added to the solution from the first process at a concentration of approximately 10% vol for 20 to 30 hours.

In a preferred embodiment of the present invention, carbon dioxide is added to the solution from the first process at a concentration of 10% vol for 24 hours.

In a third embodiment of the present invention, disclosed is a step comprises mixing calcium oxide to ammonium chloride and brine mixture to enhance ammonia recovery in the electrocoagulation cell with an $NH_3:Ca(OH)_2$ molar ratio of about 2 to about 1.

In one embodiment of the present invention, disclosed is a step comprises mixing calcium oxide to ammonium chloride and brine mixture to enhance ammonia recovery in the electrocoagulation cell with an $NH_3:Ca(OH)_2$ molar ratio about 1.5:1 to about 2.5:1.

In preferred embodiment of the present invention, the first process comprises adding calcium oxide (CaO) to the Solvay™ effluent solution at around 7.5 wt. % to raise the PH and enhance ammonia dissociation from the treated brine.

In another embodiment of the present invention, a step comprises mixing calcium oxide to ammonium chloride and brine mixture to enhance ammonia recovery in the electrocoagulation cell with an $NH_3:Ca(OH)_2$ molar ratio of about 1.5:1 to about 2.5:1.

In one aspect of the present invention, the effluent solution comprising brine and ammonia is added to the electrocoagulation cell with the further addition of $Ca(OH)_2$, and the electrocoagulation cell has an air inlet and an ammonia gas outlet.

In a further aspect of the present invention, the concentration of the ammonium chloride in the Solvay™ effluent solution is in the range of 7,500 to 30,000 mg N/L.

In a preferred aspect of the present invention, the concentration of the ammonium chloride in the Solvay™ effluent solution is in the range of 12,000 to 20,000 mg N/L.

In another aspect of the present invention, the concentration of ammonium chloride in the Solvay™ effluent is decreased to less than 10% by weight.

In a further aspect of the present invention, ammonia is recovered from ammonium chloride in a brine mixture using calcium oxide and electrocoagulation process, where the recovery efficiency is between about 90 to about 99%.

In yet another aspect of the present invention, ammonia can be recovered from water solution containing ammonium hydroxide with recovery efficiency of more than 77%.

In another aspect of the present invention, the electrocoagulation cell is used in the presence of calcium hydroxide without any additional heating added by external means to enhance the ammonia dissociation and stripping.

In another aspect of the present invention, the brine in the solution is real reject brine with a total salinity of about 70,000 to about 75,000 ppm and a pH value of about 6.8 to about 8.8.

In a further aspect of the present invention, ammonia can be recovered from water solution mixing 25 wt. % ammonium hydroxide solution to brine to recover solid magnesium hydroxide with a $NH_3:Mg$ molar ratio of about 3 to 4.

In a further aspect of the present invention, calcium oxide is mixed with ammonium chloride and brine mixture to enhance ammonia recovery in the electrocoagulation step with a $NH_3$ to $Ca(OH)_2$ molar ratio of about 1.5:1 to about 2.5:1.

In a preferred aspect of the present invention, calcium oxide is mixed with ammonium chloride and brine mixture to enhance ammonia recovery in the electrocoagulation step with a $NH_3$ to $Ca(OH)_2$ molar ratio of about 2:1.

In another aspect of the present invention, the gas flow of air to enhance the stripping of ammonia gas through the electrocoagulation process comprises an inert or reactive gas such as effluent gas or flare gas.

In yet another aspect of the present invention, the air inlet is immersed in the solution comprising brine near the bottom of the electrocoagulation cell and the ammonia gas exit tube is extended from the top of the cell to prevent the process of ammonium removal includes oxygen generation at the anode at a high pH level of 9 to 12 and enough anodic potential, to generate ammonia and hydrogen gases at the cathode, the anodic potential being easily determined by one of average skill in the art.

In a further aspect of the present invention, ammonium removal includes oxygen generation at the anode at a pH of about 10.5 to 11.5 and enough anodic potential, to generate ammonia and hydrogen gases at the cathode.

In a preferred aspect of the present invention, ammonium removal includes oxygen generation at the anode at a pH of about 11 and enough anodic potential, to generate ammonia and hydrogen gases at the cathode.

In another aspect of the present invention, the process temperature range is 35 to 40° C. at the current density of 1 to 25 $mA/cm^2$.

In a preferred aspect of the present invention, the process temperature range is 35 to 40° C. at the current density of 5 to 15 $mA/cm^2$.

In one aspect of the present invention, an energy demand is about 1.0 to 5 KW h/Kg $NH_3$.

In a preferred aspect of the present invention, an energy demand is about 1.5 to 2.5 KW h/Kg $NH_3$.

In another aspect of the present invention, the ammonia gas leaves the electrocoagulation cell, through a gas exit outlet, and dissolves in a closed-cell containing deionized water at room temperature.

Experimental Examples

Material and Methods
Ammonia Recovery from Solvay™ Process

Solvay™ process is a process for the production of sodium carbonate, wherein $CO_2$ gas is bubbled through a solution of high salinity water and ammonia. Ammonia is only buffering the solution and not consumed as a reactant. The required $CO_2$ is obtained by limestone calcination at a temperature of 950-1100° C., wherein calcium oxide and carbon dioxide are produced. The precipitated sodium bicarbonate is filtered out of the hot ammonium chloride solution and further utilized. Ammonia recovery involves the reaction of the hot solution with calcium oxide at a temperature of (160-230° C.). Calcium oxide makes a strongly basic solution and the released gas ammonia is recycled back to the initial step of the Solvay™ process according to the chemical reaction below.

$2NH_4Cl+Ca(OH)_2 \rightarrow 2NH_3(g)+2H_2O+CaCl_2)$

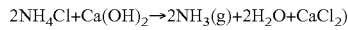

In this chemical recovery process, extensive thermal energy is consumed and for each mole of recovered ammonia 0.5 moles from calcium oxide is needed. The thermodynamic analysis has been carried out for the previous reaction using chemical reactions and equilibrium software package (HSC Chemistry) to evaluate the Gibbs free energy and heat of reactions for each reaction at different temperatures. The analysis shows that the reaction is endothermic with the positive ΔH and spontaneous at a temperature greater than 160° C., as indicated by the negative ΔG in FIG. 1.

The ammonia recovery process starts by preparing a Solvay™ effluent solution, wherein ammonia solution (25 vol. %) is added to real reject brine with salinity and magnesium content of 73,540 ppm and 2,974 ppm, respectively. The ammonia solution ($NH_4OH$) is added to high salinity brine to react with magnesium carbonate ($MgCO_3$), which is a major component of the rejected brine. Magnesium reacts with ammonia yielding a mixture of ammonium bicarbonate and magnesium hydroxide as shown in the following reaction:

$NH_3+2H_2O+MgCO_3 \rightarrow NH_4HCO_3+Mg(OH)_2$.

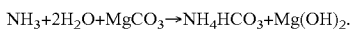

Ammonia is added in excess to maintain high pH value to ensures high magnesium recovery. In the first reaction, the ammonium hydroxide and bicarbonate will be recovered by adding the calcium oxide to the mixture to release the ammonia as a gas according to the following reactions:

First reaction: $NH_4OH+MgCO_3+CaO \rightarrow Mg(OH)_2+NH_3(g)+CaCO_3$

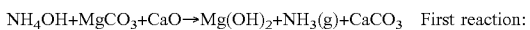

Second reaction: $NH_4OH+2CaO+H_2O \rightarrow NH_3(g)+2Ca(OH)_2$

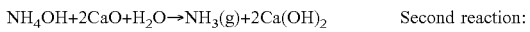

The first reaction represents the reacted ammonia and the second represents the free unreacted ammonia.

Thermodynamic analysis for the first and second reaction shows that both reactions are spontaneous as indicated by the negative ΔG, and exothermic as indicated by the negative ΔH. Experimental validation for both reactions shows the same findings but with a low rate of reaction, whereas more than 20 hours at room temperature are needed to reach full removal of ammonium. By increasing the temperature up to 60° C., only 10 hours are needed to reach the same rate of removal. These thermodynamic and experimental outcomes support the applicability of using the electrocoagulation method to accelerate the recovery of ammonia using calcium oxide in a more economical and efficient process.

The carried thermodynamic analysis does not take into consideration the presence of other components in brine, such as sodium, calcium, potassium, sulphate, and many more. Accordingly, several side reactions will decrease the desired process efficiency. However, applying the electrocoagulation process at high pH value will provide sufficient anodic potential, which generates electrons that combine at the cathode with ammonium ions and generate ammonia gas. Accordingly, using the electrocoagulation process reduces the stoichiometric ratio of the calcium oxide needed as a reactant in order to reach the required ammonia recovery or to reduce the required energy, in the form of heat needed to reach the disassociation point of ammonia gas and, accordingly, reduces the cost of the process.

The present invention is a new method to recover the ammonia from Solvay™ effluent solution in the form of ammonium hydroxide to be reused as a source of ammonium hydroxide in the Solvay™ process or other processes. The new recovery method is based on the Solvay™ process, where soda ash is manufactured by adding bubbling ammonia gas or adding ammonium hydroxide solution to high synthetic salinity water and introduce $CO_2$ gas through the solution. In this manufacturing process, calcium hydroxide is used to recover the ammonia under an elevated temperature of 160° C.; it has major limitations such as the recovery efficiency and the energy consumption associated with releasing of ammonia gas from the salt solution.

In the present invention, calcium oxide was added to ammoniated brine, which has a high concentration of ammonium chloride, at 2.5-7.5 wt. % to obtain a solution with high pH, then the mixture was introduced into a closed electrocoagulation cell. A current was applied with specific density to enhance the ammonia dissociation from the solution at a much lower temperature compared to the conventional heating method. Air bubbling was applied through Solvay™ effluent and a calcium hydroxide mixture at low gas flow rate of (100-300 ml/min) to enhance ammonia stripping from the mixture to the treating cell that has one air inlet and one ammonia gas outlet. The electrocoagulation process was applied to the treatment cell using aluminium electrodes and current density of 5-15 mA/cm$^2$.

Results

The proposed method achieved high ammonia reduction from an initial concentration, in a Solvay™ effluent, of 13,700 mg/L N to 190 mg/L N after 7 hours of treatment using the electrocoagulation cell. The ammonium chloride removal efficiency reached up to 99% from the Solvay™ effluent after around 9 hours, with ammonia recovery of 77.1% in the form of ammonium hydroxide. This can result in an energy reduction of 80% from 7.8 KWh/kg $NH_3$.

The method described in the present invention was evaluated for the recovery of ammonia from ammonium chloride from Solvay™ effluent. The method feasibility for recovery of ammonium hydroxide or bicarbonate has been also tested and showed high efficiency. In the evaluation of ammonia recovery from ammonium chloride or hydroxide and bicarbonate, a high salinity real reject brine was mixed with excess amounts of ammonium hydroxide solution 25% wt., followed with a filtration process to recover all solids in the form of magnesium hydroxide.

In an exemplary embodiment of the first process, a portion of the filtrate was tested for recovery of ammonia from ammonium hydroxide or bicarbonate by adding calcium oxide with a percentage of 1-2 wt. % and then introduced to the electrocoagulation cell and treated for 4 hours. In further embodiments, the calcium oxide concentration may vary between about 1 to about 7.5 wt %.

In the second process, a portion of the filtrate was reacted with $CO_2$ gas for 24 hours to ensure the formation of a maximum concentration of ammonium chloride. A filtration step was followed to recover all sodium bicarbonate products, and then the Solvay™ effluent was mixed with CaO with a percentage of 7.4 wt. %, which represents the stoichiometric molar ratio to recover the ammonia from ammonium chloride. The mixture was then introduced to the electrocoagulation cell and treated for 9 hours.

Figure 2:
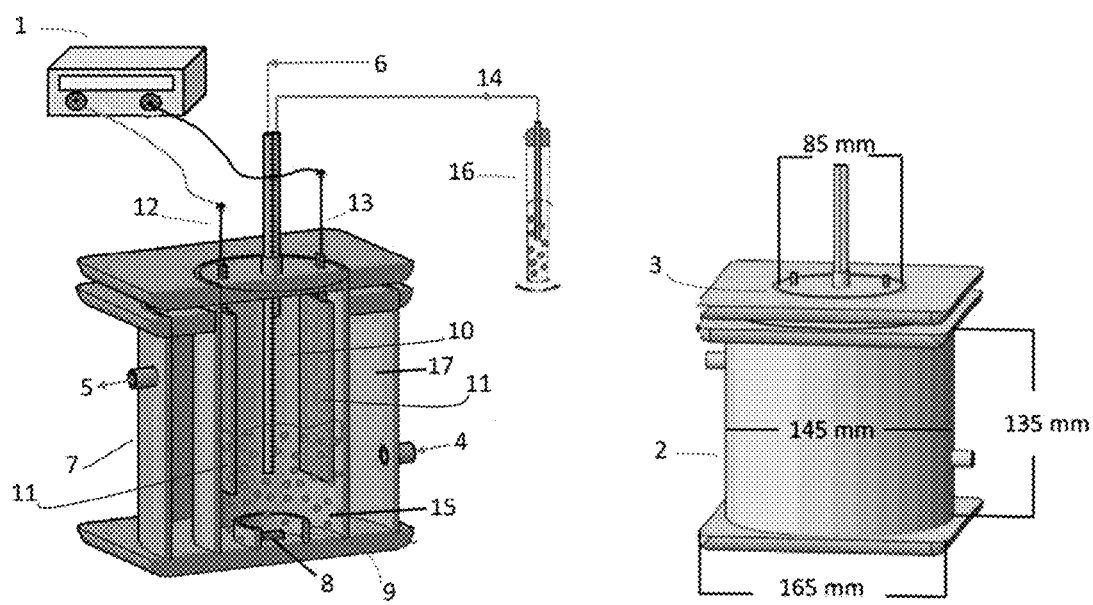
FIG. 2 shows a schematic diagram of the closed electrocoagulation cell for ammonia recovery from ammonium chloride from Solvay™ effluent.

The closed electrocoagulation cell 7, shown in FIG. 2, comprises two vertical plexiglas cylinders with a total height of 135 mm, with an outer cylinder 2 with an internal diameter of 145 mm, and an inner cylinder 3 with an internal diameter of 85 mm. The Solvay™ effluent and calcium oxide mixture were treated in the inner cylinder 3. The outer cylinder 2 is considered as a temperature control jacket 17 for the inner cylinder 3, wherein a circulation water was flowing through a water inlet 4 and a water outlet 5 to control the reaction temperature. The total working volume for the inner cylinder 3 is 1000 ml. To ensure a uniform liquid velocity distribution between the electrodes (cathode 12 and anode 13), air-jet with a flow rate of (100-300 ml/min) was introduced through an air inlet 6 extended to the bottom of the cell 7. To eliminate any bulk circulation and enhance mixing, a magnetic stirrer 8 trapped within the plexiglas ring 9 (ID of 50 mm and H of 10 mm) with a velocity of 2 RVS was placed in the centre of the cell 7 to enhance mixing inside the reactor 10. Rectangular aluminium plates 11 with a width of 55 mm, a length of 135 mm and a thickness of 2.0 mm were used as electrodes for electrocoagulation reactor 10 and inserted into the top base of the inner cylinder 3. The space between the electrodes is 50 mm. The two electrodes 12 and 13 were connected to a power supply 1 to deliver the required current using 1-4 Volts. In the middle of the inner cylinder cover, two tubes were inserted where one extends to the bottom of the reactor to provide the air inlet 6 jet and the other tube, an $NH_3$ gas outlet 14, extends to a level over the treated mixture to vent the accumulated gases out of the reactor 10 in order to prevent the liquid from leaving the reactor. The cover of the inner cylinder was closed tightly and silicone rap was used to ensure no gas leakages from the edges.

In all experiments, the reactor was filled with a total volume of 250 mL of the treated mixture. The applied current and voltage were maintained to be fixed for each experiment and temperature was controlled for each run at a specific value. After each run, the treated brine samples 15 were collected and filtrated by using Buchner funnel filtrating kit to separate the solid coagulants. The $NH_3$ gas outlet 14 (ammonia gas) was inserted in a 50 ml container 16 of deionized water at a controlled temperature and analyzed by the end of each run for recovered ammonia concentration.

Ammonia Recovery from Ammonium Chloride

In this process, ammonia was added to brine with a concentration of 2.65 mol/L and magnesium hydroxide solids were filtrated. The Solvay™ process has been carried out by bubbling $CO_2$ gas (10% vol.) for 24 hours. At the end of this time, sodium bicarbonate solids have been filtrated, and the effluent of the Solvay™ process has been treated using electrocoagulation cell.

Figure 3:
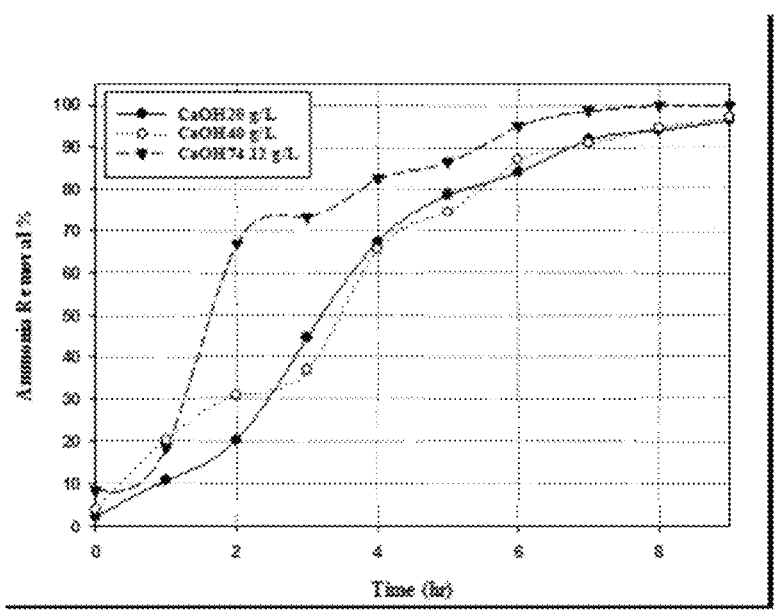
FIG. 3 illustrates ammonia removal percentage versus time for different CaO concentrations using electrocoagulation process at current density of 9.8 mA/cm2 and at room temperature.

The decrease in ammonia concentration was measured using HACH-Intellical™ ISENH3181 ammonia ion-selective electrode over 9 hours. Different concentrations of calcium oxide were used. The electrocoagulation process has been carried out at room temperature and the current density of 9.8 mA/cm$^2$. The results indicate that the concentration of CaO has a significant effect on reaction time, where high CaO concentrations accelerate the ammonia recovery. FIG. 3 shows the effect of CaO concentration on ammonium chloride removal percentage from Solvay™ effluent with time. A tube containing ammonia gas was inserted in 50 ml of deionized water at a controlled temperature and analyzed by the end of each run for recovered ammonia concentration.

Figure 4:
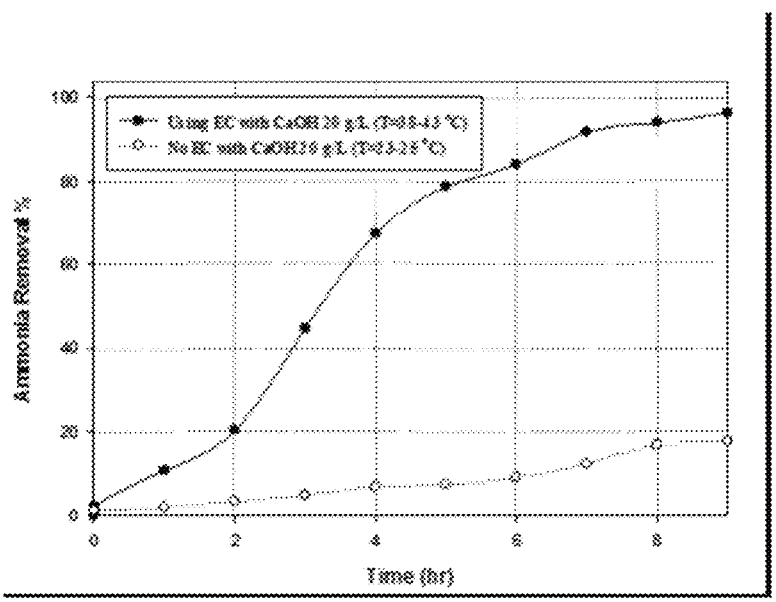
FIG. 4 illustrates ammonia removal percentage versus time with and without electrocoagulation process at the same CaO concentration of 20 g/L and same current density of 9.8 $mA/cm^2$.

The effect of electrocoagulation on the removal of ammonium chloride from Solvay™ effluent was carried out by comparing the removal with the case of not using electrocoagulation at the same CaO concentration. It was found that the electrocoagulation process enhanced the removal by almost 80% in the same period as shown in FIG. 4.

Figure 5:
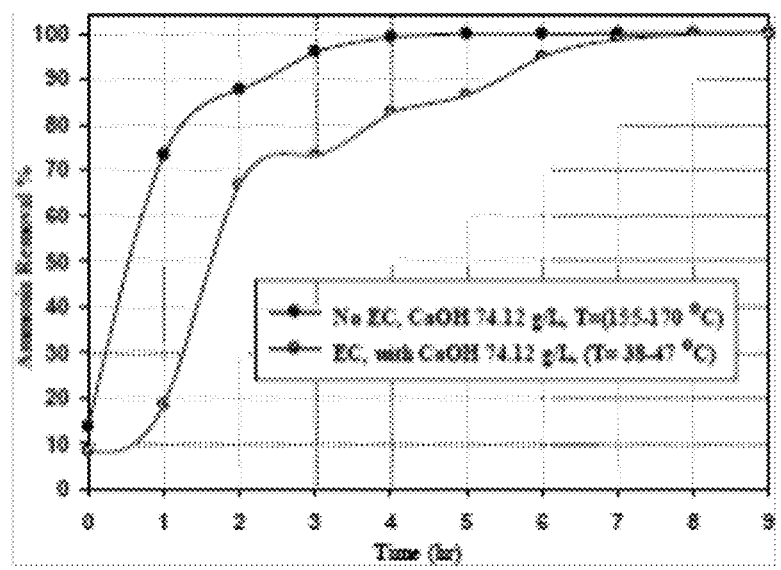
FIG. 5 illustrates ammonia removal percentage versus time at CaO concentration of 74 g/L with electrocoagulation at current density of 9.8 $mA/cm^2$ and at room temperature, and with heating up to temperature of 160° C.

The decrease in the ammonia concentration in the Solvay™ effluent was tested using a process well known in the art, which includes adding a stoichiometric quantity of CaO and increasing the solution temperature up to 160° C. The results were compared with the proposed method by adding the same quantity of CaO, and using electrocoagulation with a current density of 9.8 mA/cm2 at room temperature. The results, as shown in FIG. 5, indicate that most of the ammonia has been removed from the Solvay™ effluent after 4 hours for the heating process, and after 7 hours for the electrocoagulation process. These results show the high potential for using the electrocoagulation process in ammonia recovery from ammonium chloride and can be further optimized.

The concentration of ammonia in the recovery unit containing deionized water was measured and the recovery percentage of ammonia was calculated. It was found that electrocoagulation process can recover around 80% of the ammonia as ammonium hydroxide. In additional, the energy required in electrocoagulation at the above described conditions was found to be only 2.3 KWh/kg $NH_3$, saving approximately 80% of the consumed energy in the step of ammonia disassociation from the Solvay™ effluent solution. FIG. 6 summaries the main findings in the mentioned screening process.

Figure 7:
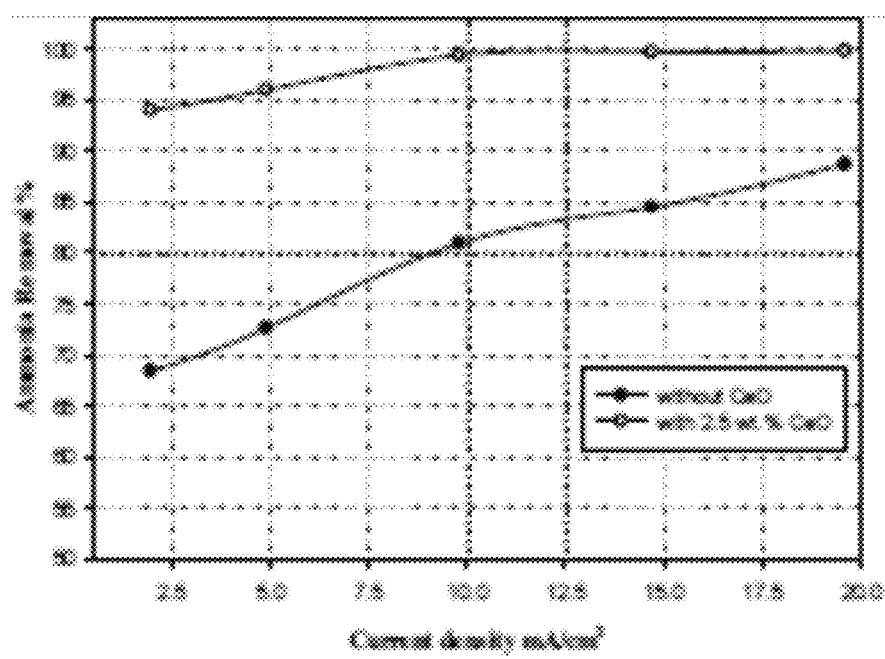
FIG. 7 illustrates ammonia removal versus current density after 4 hours of electrocoagulation with and without CaO at room temperature.
Figure 8:
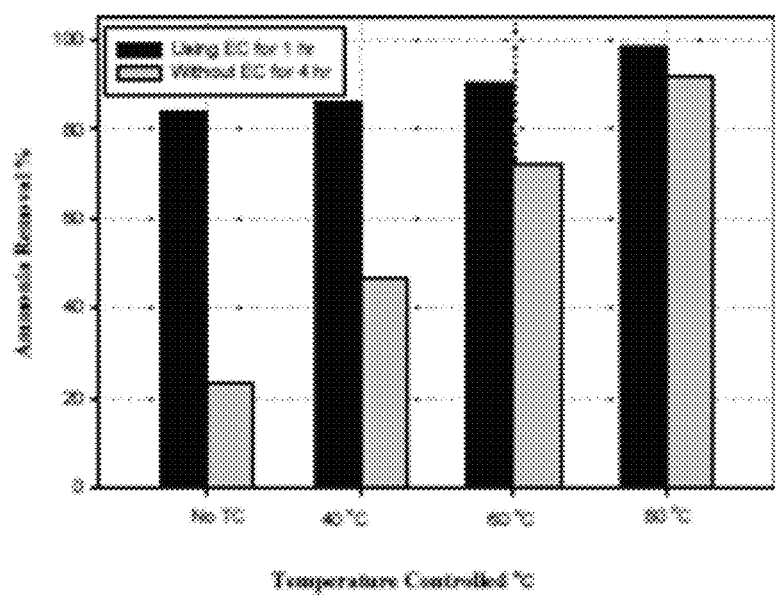
FIG. 8 illustrates The ammonia removal percentage versus temperature after 1 hr using electrocoagulation and 4 hr without electrocoagulation and at concentration of CaO 20 g/L and current density of 9.8 mA/cm$^2$.

This step of the process is very important since not all of the ammonia added in the Solvay™ process will react to form the ammonium chlorid and is very important to determine the ability of the electrocoagulation process to recover the ammonia in the form of ammonium hydroxide or bicarbonate as described above. In this process, no reaction with $CO_2$ gas is carried out, only mixing the ammonia with brine in the first process and filtration to recover the magnesium hydroxide solids in the second process. The filtrate contains also free ammonium hydroxide or ammonium bicarbonate. This filtrate was introduced to the electrocoagulation cell with and without adding CaO at different current densities. FIG. 7, indicates the positive effect of CaO on ammonium removal and this is related to the increase in the pH level of the treated solution. The time of complete removal was found to be around 4 hours in the case of using CaO concentration of 20 g/L, the solution temperature was found to increase in the range of 37-40° C. for both cases.

The effect of temperature on ammonium removal with electrocoagulation for one hour and without electrocoagulation for 4 hours showed the high ability of electrocoagulation process to remove more than 80% from ammonia after 1 hour only at room temperature compared to the high temperature of 80° C., which is needed to remove almost the same amount after 4 hours in case of no electrocoagulation process is used.

The concentration of ammonia in the closed recovery unit containing deionized water for this process was measured and the recovery percentage of ammonia was calculated. The effect of CaO presence on the percentage of recovered ammonia at different current densities from ammonium hydroxide solution using electrocoagulation unit and CaO concentration of 20 g/L reached up to 70.8% at current density of 24.5 mA/cm2 after 4 hours, and up to 46.7% ammonia recovery at the same current density and treating time but without using CaO. Using higher CaO concentrations improves the process, requiring processes to recover the calcium content from the treated solution.

REFERENCES

[1] A. Mohammad, M. El-Naas, A. Al-Marzouqi, M. Suleiman, M. Musharfy, Optimization of magnesium recovery from reject brine for reuse in desalination post-treatment, Journal of Water Process Engineering, 31 (2019).

[2] S. Ryskie, C. Gonzalez-Merchan, C. M. Neculita, T. Genty, Efficiency of ozone microbubbles for ammonia removal from mine effluents, Minerals Engineering, 145 (2020) 106071.

[3] D. Qu, D. Sun, H. Wang, Y. Yun, Experimental study of ammonia removal from water by modified direct contact membrane distillation, Desalination, 326 (2013) 135-140.

[4] X. Yang, H. Pang, J. Zhang, A. Liubinas, M. Duke, Sustainable waste water deammonification by vacuum membrane distillation without pH adjustment: Role of water chemistry, Chemical Engineering Journal, 328 (2017) 884-893.

[5] Q. He, T. Tu, S. Yan, X. Yang, M. Duke, Y. Zhang, S. Zhao, Relating water vapor transfer to ammonia recovery from biogas slurry by vacuum membrane distillation, Separation and Purification Technology, 191 (2018) 182-191.

[6] X. Yang, S. Sheridan, L. Ding, D. K. Wang, S. Smart, J. C. Diniz da Costa, A. Liubinas, M. Duke, Inter-layer free cobalt-doped silica membranes for pervaporation of ammonia solutions, Journal of Membrane Science, 553 (2018) 111-116.

[7] M. Mukaddam, E. Litwiller, I. Pinnau, Pressure-dependent pure- and mixed-gas permeation properties of Nafion®, Journal of Membrane Science, 513 (2016) 140-145.

[8] J. W. Park, R. Wycisk, P. N. Pintauro, Nafion/PVDF nanofiber composite membranes for regenerative hydrogen/bromine fuel cells, Journal of Membrane Science, 490 (2015) 103-112.

[9] C. Yang, W. Zhao, B. Fang, X. Xu, Y. Zhang, Y. Gai, W. Zhang, D. S. Venables, W. Chen, Removing Water Vapor Interference in Peroxy Radical Chemical Amplification with a Large Diameter Nafion Dryer, Analytical Chemistry, 90 (2018) 3307-3312.

[10] A. M. Baker, L. Wang, W. B. Johnson, A. K. Prasad, S. G. Advani, Nafion Membranes Reinforced with Ceria-Coated Multiwall Carbon Nanotubes for Improved Mechanical and Chemical Durability in Polymer Electrolyte Membrane Fuel Cells, The Journal of Physical Chemistry C, 118 (2014) 26796-26802.

[11] V. V. Ranade, V. M. Bhandari, Industrial Wastewater Treatment, Recycling and Reuse, Elsevier Science, 2014.

[12] A. Hasanoglu, J. Romero, B. Perez, A. Plaza, Ammonia removal from wastewater streams through membrane contactors: Experimental and theoretical analysis of operation parameters and configuration, Chemical Engineering Journal, 160 (2010) 530-537.

[13] J. W. Plunkett, The Almanac of American Employers 2008, Plunkett Research Limited, 2007.

What is claimed is:

1. A method for ammonia recovery from contaminated water including an effluent solution comprising ammonia ($NH_4OH$), magnesium carbonate, and high salinity brine, and aqueous solutions, wherein the method comprises a first process comprising the steps of:
   adding calcium oxide to the effluent solution at a concentration from about 0.5% to about 10%;
   applying an electrocoagulation process to the solution with aluminum electrodes and a current density of about −5 to about 15 $mA/cm^2$-over 4-9 hours; and
   applying air bubbling through the solution at gas flow rate of 100 to 300 ml/min in a treating cell with one air inlet and one ammonia gas exit outlet for stripping ammonia from the solution, wherein ammonia is recovered from ammonium chloride or ammonium hydroxide in a brine mixture using calcium oxide and electrocoagulation process, wherein the recovery efficiency is between about 90 to about 99%.

2. The method of claim 1, wherein the method further comprises a second process comprising the steps of:
   reacting the solution form the first process with carbon dioxide;
   filtrating the solution to recover solids precipitates;
   adding calcium hydroxide to the filtrate solution to obtain a pH higher than 11; and
   introducing the solution inside the electrocoagulation cell.

3. The method of claim 1, further comprising mixing calcium oxide to ammonium chloride and brine mixture to enhance ammonia recovery in the electrocoagulation step with an $NH_3:Ca(OH)_2$ molar ratio of about 2 to about 1.

4. The method of claim 2, wherein the molar ratio is about 2:1.

5. The method of claim 1, wherein the solution comprises brine and ammonia and further $Ca(OH)_2$ is added to the electrocoagulation cell and the electrocoagulation cell has an inlet for air and one outlet for ammonia gas.

6. The method of any of the preceding claims, wherein the concentration of ammonium chloride in the effluent solution is in the range of about 12,000 to about 20,000 mg N/L.

7. The method of any of the preceding claims, wherein the concentration of ammonium chloride in the effluent is decreased to less than 10% by weight.

8. The method of any of the preceding claims, wherein ammonia can be recovered from water solution containing ammonium hydroxide with recovery efficiency of more than 77%.

9. The method of claim 1, where an electrocoagulation cell is used in the presence of calcium hydroxide without any additional heating to enhance the ammonia dissociation and stripping.

10. The method of claim 5, wherein the brine is real reject brine with a total salinity of about 70,000 to about 75,000 ppm and a pH value of about 8.6 to about 8.8.

11. The method of claim 10, comprising mixing 25 wt % ammonium hydroxide solution to the brine to recover solid magnesium hydroxide with a $NH_3:Mg$ molar ratio of about 3 to about 4.

12. The method of claim 10, further comprising mixing calcium oxide to ammonium chloride and brine mixture to enhance ammonia recovery in the electrocoagulation step with a $NH_3$ to $Ca(OH)_2$ molar ratio of about 2:1.

13. The method of claim 1, wherein the gas flow of air to enhance the stripping of ammonia gas through the electrocoagulation process comprises an inert or reactive gas such as effluent gas or flare gas.

14. The method of claim 1, wherein the air inlet is immersed in the solution comprising brine near the bottom of the electrocoagulation cell and the ammonia gas exit outlet is a tube which is extended from the top of the cell and the process of ammonium removal includes oxygen generation at the anode at a high pH level and enough anodic potential, to generate ammonia and hydrogen gases at the cathode.

15. The method of claim 2, wherein ammonium removal includes oxygen generation at the anode at a pH of about 10.5 to 11.5.

16. The method of claim 1, wherein the process temperature range is 35 to 40° C. at the current density of about 5 to about 15 $mA/cm^2$.

17. The method of claim 1, wherein an energy demand is about 1.5 to 2.5 KW h/Kg $NH_3$.

18. The method of claim 1, wherein the ammonia gas leaves the electrocoagulation cell, through a gas exit outlet-, and dissolves in a closed-cell containing deionized water at room temperature.

* * * * *